INVENTORS
DANIEL ABRAMS
BY ALVIN VACHITIS
ATTYS.

INVENTORS
DANIEL ABRAMS
ALVIN VACHITIS
BY
ATTYS.

3,106,686
POTENTIOMETER CORRECTION CIRCUIT
Daniel Abrams, Westfield, and Alvin Vachitis, Perth Amboy, N.J., assignors to Gulton Industries, Inc., Metuchen, N.J., a corporation of New Jersey
Filed Sept. 28, 1961, Ser. No. 141,534
9 Claims. (Cl. 330—87)

This invention relates to potentiometer circuits and, more particularly, to potentiometer circuits used with time varying amplitude signals.

As is well known, a potentiometer is a device which includes a resistance element having a wiper contact movable progressively therealong. The input voltage to the potentiometer is applied across a pair of input terminals at the ends of the resistance element and the output from the potentiometer is taken between the wiper and one of the input terminals usually connected to ground or other common reference voltage point. For most potentiometer applications the resistance element is a linear element wherein variation in resistance between the wiper and the grounded end of the resistance element varies linearly with the position of the wiper. Where the output of the potentiometer is coupled to a circuit having a very high impedance relative to that of the resistance element so that no loading effects are present, the output voltage of the potentiometer also varies linearly with the position of the wiper. It is, of course, desirable that the potentiometer be linear for all positions of the wiper and that a zero output voltage be obtained when the wiper is moved to its extreme position against the grounded input terminal.

Unfortunately, due in part to contact resistance or end resistance, a finite output is usually present in the potentiometer even when the wiper has been positioned fully to its low output position. The end resistance also introduces a non-linear factor in the potentiometer output characteristic when the wiper approaches or is in the vicinity of the low output end of the potentiometer. This end resistance, in some cases, amounts to as much as 0.5 percent of the total resistance which is significant for many applications requiring precision potentiometers. The end resistance frequently causes percentage errors based on the actual measured output values, as distinguished from full scale readings, of twenty percent (20%) and higher for wiper positions near the low output end of the potentiometer.

One of the objects of the present invention is to provide a uniquely simple and effective means for dealing with the end resistance problem referred to, so that the potentiometer can have a linear output characteristic for practically the entire range of movement of the wiper, and a substantially zero output can be obtained when the wiper is at the low output end of the potentiometer.

Other objects and advantages of the invention will become apparent upon making reference to the specification to follow, the claims and the drawings wherein:

Figure 1:
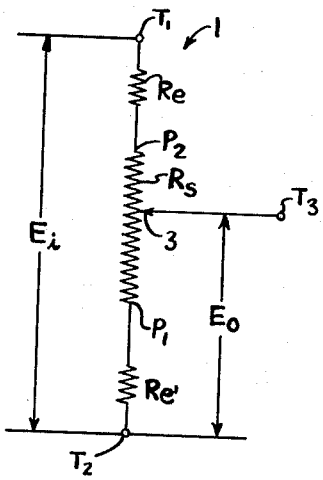
FIG. 1 shows the equivalent circuit for a potentiometer.
Figure 2:
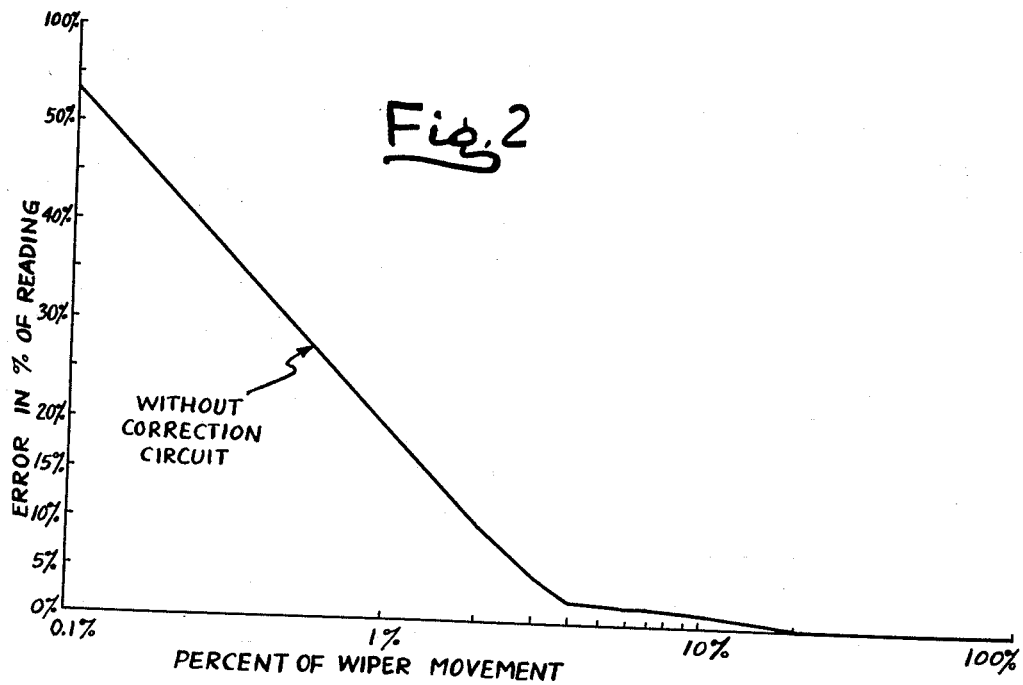
FIG. 2 is a diagram illustrating the error in percent of reading caused by potentiometer end resistance.
Figure 3:
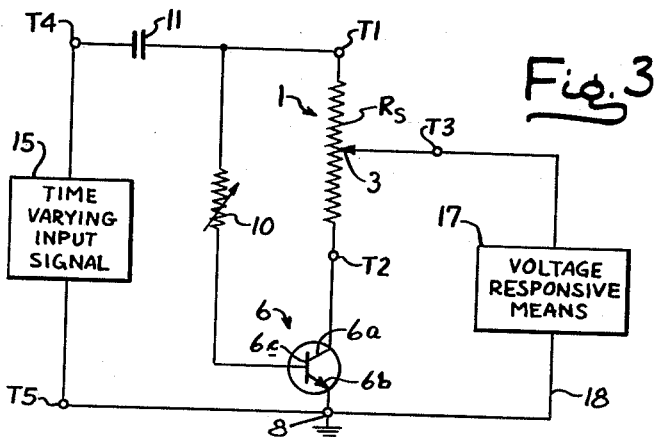
FIG. 3 is a circuit diagram illustrating an exemplary form of the present invention using a transistor.

Referring now to FIGS. 1 through 3, a potentiometer 1 is shown having a slide wire or other resistance element $R_s$ along which a wiper 3 slides. The limits of movement of the wiper 3 are indicated by stop points $p1$ and $p2$ at the ends of the resistance element. The potentiometer has a pair of input terminals T1 and T2 at the ends of the resistance element across which the input voltage $Ei$ is applied and an output terminal T3 to which the wiper 3 is connected. Between the terminals T1 and T2 and the stop points $p1$ and $p2$ finite resistances $Re$ and $Re'$ exist which are frequently referred to as end resistance. Considering the lower terminal T2 as a grounded or common reference point terminal, it is apparent that when the wiper 3 is resting on the stop point $p1$ that a finite output voltage $Eo$ will appear between the wiper and ground in accordance with the following formula:

$$Eo = Re'/(Re + Rs + Re') \times Ei$$

The end resistances $Re$ and $Re'$ may introduce a significant error factor when the wiper is in the vicinity of the stop point $p1$. As previously indicated, in terms of error in percent of the reading, the errors introduced by the end resistance become quite substantial when the wiper is in the vicinity of the stop point $p1$. In one typical example illustrated in FIG. 2, when the wiper 3 is advanced beyond the stop point $p1$ to a point which is in the neighborhood of 8 percent of the maximum possible movement of the wiper, the error was approximately 2 percent of the reading, an error which is significant in some applications. When the wiper is in a position where it is spaced from the stop point $p1$ approximately 1 percent of the total possible movement of the wiper, the degree of error was 20 percent of the reading. When the present invention is incorporated in the potentiometer circuit described, the error is reduced substantially to zero at the 8 percent wiper position of the wiper 3 and was only 2½ percent for the 1 percent wiper position.

Figure 4:
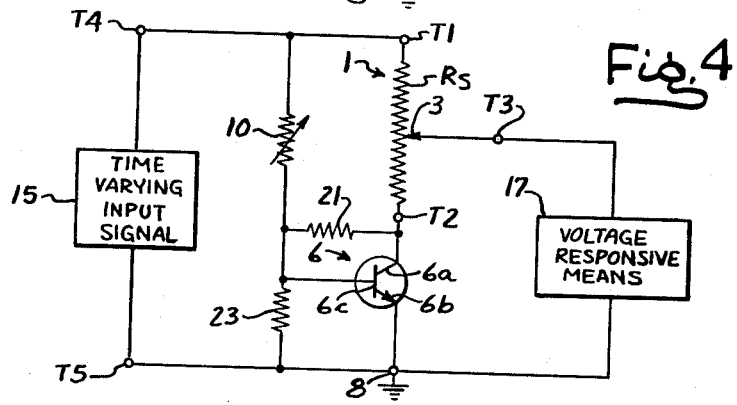
FIG. 4 is a view of the exemplary form of the invention shown in FIG. 3 with the addition of transistor gain stabilizing resistors.
Figure 5:
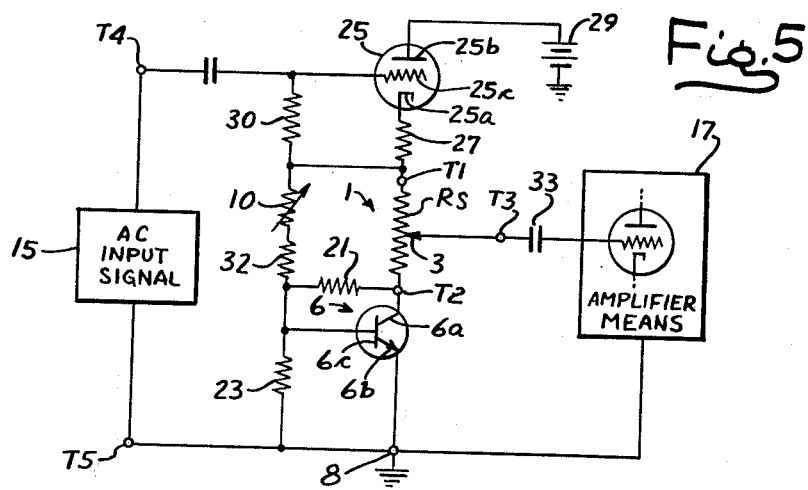
FIG. 5 is a circuit diagram of the present invention applied to a cathode follower circuit.

Although the present invention may take a variety of forms, the most preferred form thereof utilizes a phase inversion element, generally indicated by reference numeral 6 in FIGS. 3–5 positioned between the lower input terminal T2 and ground 8. Most advantageously, the phase inversion means 6 constitutes an NPN transistor. The transistor illustrated has a collector electrode 6a connected to the terminal T2 and an emitter electrode 6b connected to ground. The transistor has a base electrode 6c connected through a variable resistor 10 to the upper terminal T1 of the potentiometer.

In the simplest form of the invention shown in FIG. 4, the upper terminal T1 of the potentiometer is connected through a coupling capacitor 11 to a main potentiometer circuit input terminal T4. The capacitor 11 filters out any direct current component from the input signal where direct current is not desired in the output of the potentiometer. The capacitor 11 could, of course, be positioned if desired, elsewhere in the circuit. The circuit has another main signal input terminal T5 which is shown connected to the ground or reference voltage point 8. A time varying input signal source 15 whose output is to be handled by the potentiometer is connected across the main signal input terminals T4 and T5. This time varying input signal source, for example, may be a source of alternating current potential.

The circuit of FIG. 2 is completed by connecting the wiper terminal T3 of the potentiometer to a suitable voltage or current responsive means generally indicated by reference numeral 17. The aforesaid capacitor 11 could obviously be interposed instead between the wiper 3 and the voltage responsive means 17. The voltage responsive means also has a connecting lead 18 extending to the reference voltage or ground point 8.

Where a zero output is desired when the wiper 3 is positioned at the lower stop point $p1$, with the wiper in this position, the variable resistor 10 is adjusted to provide a zero output as indicated by the voltage responsive means 17. The zero output condition is obtainable because the NPN transistor 6 acts as a phase inversion unit. The current or voltage fed to the base electrode 6c of transistor 6 through the resistor 10 is in phase with the input to the potentiometer, but the transistor provides at the output or load terminals 6a—6b thereof a voltage and current component which is 180° out of phase with the applied voltage to the transistor and potentiometer. By adjusting the value of the resistor 10, the base current of the transistor is set so that the voltage in the load circuit of the transistor just exactly cancels out the voltage developed across the potentiometer end resistance Re′ previously referred to.

The addition of the transistor 6 and the variable resistor 10 provides a very simple and inexpensive means for correcting the non-linear as well as the non-zero output referred to, although the non-linear correction is not a complete correction. These elements also provide an extremely useful means for adjusting the zero point of the potentiometer. Thus, by adjusting the value of the resistor 10 the voltage introduced in the output circuit of the transistor 6 may be substantially greater than the voltage developed in the end resistance of the potentiometer. In such case, the zero output point of the wiper will be a wiper position above the stop point p1. The zero voltage point can be made to fall almost anywhere along the length of the potentiometer resistance element Rs. This variable ground tap feature of the potentiometer is useful in applications requiring phase reversals when the wiper passes through a zero point.

Transistor characteristics vary somewhat with temperature, and different transistor samples of the same type frequently have somewhat different characteristics at a given temperature. Accordingly, to stabilize the gain of the transistor 6, a pair of stabilizing resistors 21 and 23 are added to the transistor portion of the potentiometer circuit in FIG. 4. The resistor 21 is connected between the collector electrode 6a of the transistor 6 and the base electrode 6c thereof and the resistor 23 is connected between the base electrode 6c and ground.

Refer now to the circuit shown in FIG. 5 which applies the potentiometer circuit of FIG. 3 to a cathode follower circuit. The cathode follower circuit there shown includes a triode vacuum tube 25 having a cathode 25a connected through a resistor 27 to the upper terminal T1 of the potentiometer unit 1. The vacuum tube further has a plate 25b connected to the positive terminal of a source of direct current voltage 29. The vacuum tube 25 further has a control grid 25c connected through capacitor 11 to the main signal input terminal T4 and through a resistor 30 to the juncture between cathode resistor 27 and the potentiometer terminal T1.

The variable base current adjusting resistor 10 is shown connected in series with a current-limiting resistor 32. The resistors 10 and 32 are connected in series between the potentiometer terminal T1 and the base electrode 6c of the transistor 6. The transistor characteristics stabilizing resistors 21 and 23 are shown connected in the same way previously described in connection with the circuit of FIG. 4. Likewise, the transistor 6 has the same connections as previously described with the bottom terminal T2 of the potentiometer and ground. The potentiometer wiper terminal T3 is shown connected through a capacitor 33 to the input circuit of an amplifier constituting part of the voltage responsive means 17 in FIGS. 3 and 4.

The manner in which the circuit of FIG. 5 corrects for the end resistance errors in the potentiometer 1 is identical to that described in connection with the circuits of FIGS. 2 and 3.

The values of the resistors in the various circuits of FIGS. 3–5 may vary widely. It is apparent, however, that the values of resistors 27 normally is selected to provide Class A operating conditions for the vacuum tube 25. The following are exemplary values for the various resistors in FIG. 5 when the vacuum tube 25 is a type 6922 triode, the output of direct current voltage source 29 is 35 volts and the transistor 6 is a Gt1278 transistor:

R27—820 ohms
Rs—24,000 ohms
R21—2,200 ohms
R23—470 ohms
R23—330,000 ohms
R10—100,000 ohms
R30—18 megohms It should be understood that numerous modifications may be made of the circuitry shown above without deviating from the broader aspects of the present invention.

What we claim as new and desire to protect by Letters Patent of the United States is:

1. In combination with a pair of main signal input terminals across which a source of voltage whose amplitude varies with time is to be applied, a potentiometer including a resistance-forming portion having a pair of signal input terminals at the ends thereof and an output wiper which makes progressive contact with said resistance-forming portion, one of said signal input terminals being coupled to one of said main signal input terminals, the improvement comprising means for adjusting the zero output position of said wiper comprising: phase inversion means having an input coupled across said main signal input terminals and an output at which a voltage appears 180° out of phase with the input voltage thereto, means for adjusting the amplitude of the voltage coupled to the input of said phase inversion means, and means connecting the output of said phase inversion means in series between said other potentiometer signal input terminal and the other main signal input terminal where the phase inverted voltage in the output of said phase inversion means opposes the voltage coupled directly thereto from said main signal input terminals.

2. In combination with a pair of main signal input terminals across which a source of voltage whose amplitude varies with time is to be applied, a potentiometer including a resistance-forming portion having a pair of signal input terminals at the ends thereof and an output wiper which makes progressive contact with said resistance-forming portion, one of said signal input terminals being coupled to one of said main signal input terminals, said resistance-forming portion having an end resistance which introduces a finite output in the potentiometer when the wiper is positioned in an extreme position adjacent the other potentiometer signal input terminal, the improvement comprising means for cancelling the effects of said end resistance, said means comprising phase inversion means having an input coupled across said main signal input terminals and an output at which a voltage appears 180° out of phase with the input voltage thereto, and means connecting the output of said phase inversion means in series between said other potentiometer signal input terminal and the other main signal input terminal where the phase inverted voltage in the output of said phase inversion means cancels out the end resistance voltage of the potentiometer.

3. In combination with a pair of main signal input terminals across which a source of voltage whose amplitude varies with time is to be applied, a potentiometer including a resistance-forming portion having a pair of signal input terminals at the ends thereof and an output wiper which makes progressive contact with said resistance-forming portion, one of said signal input terminals being coupled to one of said main signal input terminals, said resistance-forming portion having an end resistance which introduces a finite output in the potentiometer when the wiper is positioned in an extreme position adjacent the other potentiometer signal input terminal, the improvement comprising means for cancelling the effects of said end resistance, said means comprising phase inversion means having an input coupled across said main signal input terminals and an output at which a voltage appears 180° out of phase with the input voltage thereto, means for adjusting the amplitude of the voltage coupled to the input of said phase inversion means, and means connecting the output of said phase inversion means in series between said other potentiometer signal input terminal and the other main signal input terminal where the phase inverted voltage in the output of said phase inversion means opposes the end resistance voltage of the potentiometer.

4. In combination, a source of voltage having a pair of output terminals at which appears a voltage whose amplitude varies with time, a potentiometer including a resistance-forming portion having a pair of input terminals at the ends thereof and an output wiper which makes progressive contact with said resistance-forming portion, one of said input terminals being coupled to one of the output terminals of said source of voltage, the improvement comprising phase inversion means having an input coupled across the output terminals of said source of voltage and an output at which a voltage appears 180° out of phase with the input voltage, means for adjusting the amplitude of the voltage coupled to the input of the phase inversion means, and means connecting the output of said phase inversion means in series between said other potentiometer input terminal and the other output terminal of said source of voltage where the phase inverted voltage in the output of said phase inversion means opposes the voltage coupled to said potentiometer directly from said source of voltage.

5. A potentiometer circuit comprising a pair of main signal input terminals across which a source of time varying voltage is to be applied, a potentiometer including a resistance-forming portion connected at one end to one of said main signal input terminals, and a wiper for making progressive contact with said resistance-forming portion, a reference voltage point to which the other of said main signal input terminals is coupled, and means for adjusting the output of said potentiometer for a given position of said wiper, said last-mentioned means comprising a transistor having a control terminal and a pair of load terminals, a variable resistor coupled between said control terminal and said one main signal input terminal, whereby the input voltage to the potentiometer is coupled through a variable impedance to the control terminal of said transistor, said load terminals of said transistor connected between said other end of said resistance-forming portion of the potentiometer and said reference voltage point, the connections of said transistor load terminals being such that the voltage output thereof will oppose the voltage across said potentiometer resistance-forming portion by the voltage from said main signal input terminals.

6. A potentiometer circuit comprising a pair of main signal input terminals across which a source of time varying voltage is to be applied, a potentiometer including a resistance-forming portion connected at one end to one of said main signal input terminals, and a wiper for making progressive contact with said resistance-forming portion, a reference voltage point to which the other of said main signal input terminals is coupled, means for adjusting the output of said potentiometer for a given position of said wiper, said last-mentioned means comprising a transistor having a control terminal and a pair of load terminals, a variable resistor coupled between said control terminal and said one main signal input terminal, whereby the input voltage to the potentiometer is coupled through a variable impedance to the control terminal of said transistor, said load terminals of said transistor connected between said other end of said resistance-forming portion of the potentiometer and said reference voltage point, the connections of said transistor load terminals being such that the voltage output thereof will oppose the voltage across said potentiometer resistance-forming portion by the voltage from said main signal input terminals, and gain stabilizing means for stabilizing the input-output characteristics of the transistor comprising a first resistor coupled between the control terminal of said transistor and the load terminal nearest said other end of said resistance-forming portion of the potentiometer and a second resistor coupled between the control terminal of said transistor and said common reference voltage point.

7. A potentiometer circuit comprising: a source of time varying voltage, a pair of main signal input terminals across which said source of time varying voltage is connected, a potentiometer including a resistance-forming portion connected at one end to one of said main signal input terminals, and a wiper for making progressive contact with said resistance-forming portion, a reference voltage point to which the other of said main signal input terminals is coupled, and means for adjusting the output of said potentiometer for a given position of said wiper, said last-mentioned means comprising an NPN transistor having a base electrode terminal, an emitter electrode terminal and a collector electrode terminal, a variable resistor coupled between said base electrode terminal and one main signal input terminal, whereby the input voltage to the potentiometer is coupled through a variable impedance to the base electrode terminal of said transistor, said collector electrode terminal being coupled between said other end of said resistance-forming portion of the potentiometer and the emitter electrode terminal being coupled to said reference voltage point.

8. In a cathode follower circuit including a current control device having a control electrode, an anode electrode and a cathode electrode, and a source of alternating current connected between said control electrode and a reference voltage point, a potentiometer circuit connected between said cathode electrode and said common reference voltage point, said potentiometer circuit including a potentiometer having a resistance-forming portion and a wiper for making progressive contact therewith, means coupling one end of said resistance-forming portion to said cathode electrode, a first resistor coupled between said control electrode and the end of said resistance-forming portion of the potentiometer coupled to said cathode electrode, an NPN transistor having base, collector and emitter electrodes, said collector electrode being connected to the other end of said resistance-forming portion of said potentiometer, said emitter electrode being connected to said reference voltage point, and an adjustable resistor coupled between the base electrode of the transistor and said first resistor.

9. In a cathode follower circuit including a current control device having a control electrode, an anode electrode and a cathode electrode, and a source of alternating current connected between said control electrode and a reference voltage point, a potentiometer circuit connected between said cathode electrode and said common reference voltage point, said potentiometer circuit including a potentiometer having a resistance-forming portion and a wiper for making progressive contact therewith, a first resistor coupled between one end of said resistance-forming portion and said cathode electrode, a second resistor coupled between said control electrode and the end of said resistance-forming portion of the potentiometer coupled to said cathode electrode, an NPN transistor having base, collector and emitter electrodes, said collector electrode being connected to the other end of said resistance-forming portion of said potentiometer, said emitter electrode being connected to said reference voltage point, and an adjustable resistor coupled between the base electrode of the transistor and the juncture of said first and second resistors.

No references cited.